J. H. PITKIN.
Rotary Plows.

No. 151,510.

Patented June 2, 1874.

Witnesses.
D. R. Cowl
Edmund Masson

Inventor:
Julian H. Pitkin.
By atty. A. B. Stoughton.

UNITED STATES PATENT OFFICE.

JULIAN H. PITKIN, OF AKRON, OHIO.

IMPROVEMENT IN ROTARY PLOWS.

Specification forming part of Letters Patent No. 151,510, dated June 2, 1874; application filed April 24, 1874.

*To all whom it may concern:*

Be it known that I, JULIAN H. PITKIN, of Akron, in the county of Summit and State of Ohio, have invented certain new and useful Improvements in Rotary Plows or Spading-Machines; and I do hereby declare the following to be a full, clear, and exact description of the same, reference being had to the accompanying drawings making a part of this specification, in which—

Figure 1:
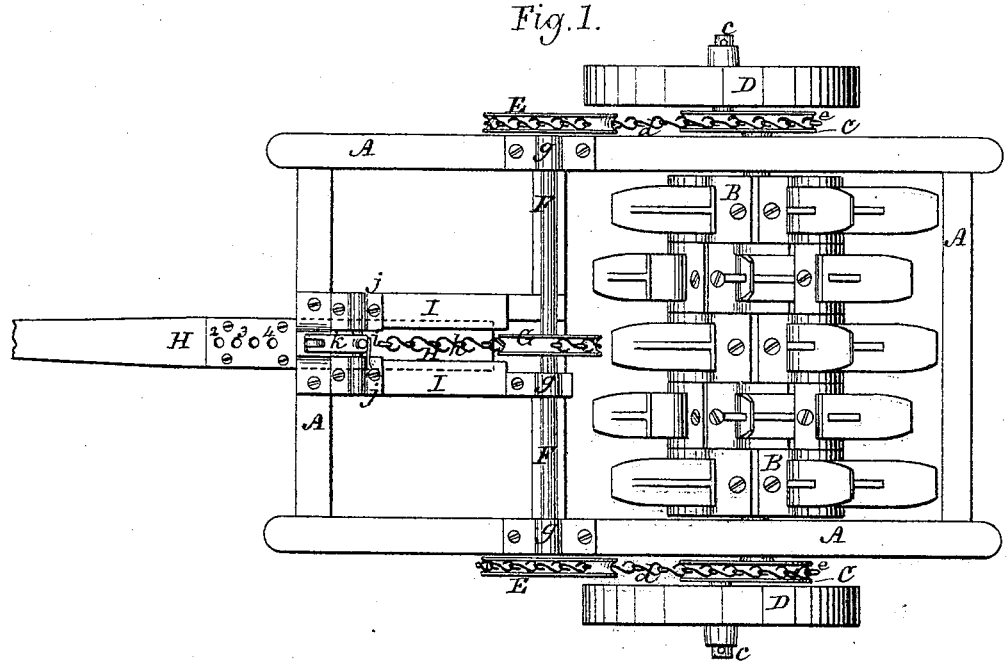
Figure 2:
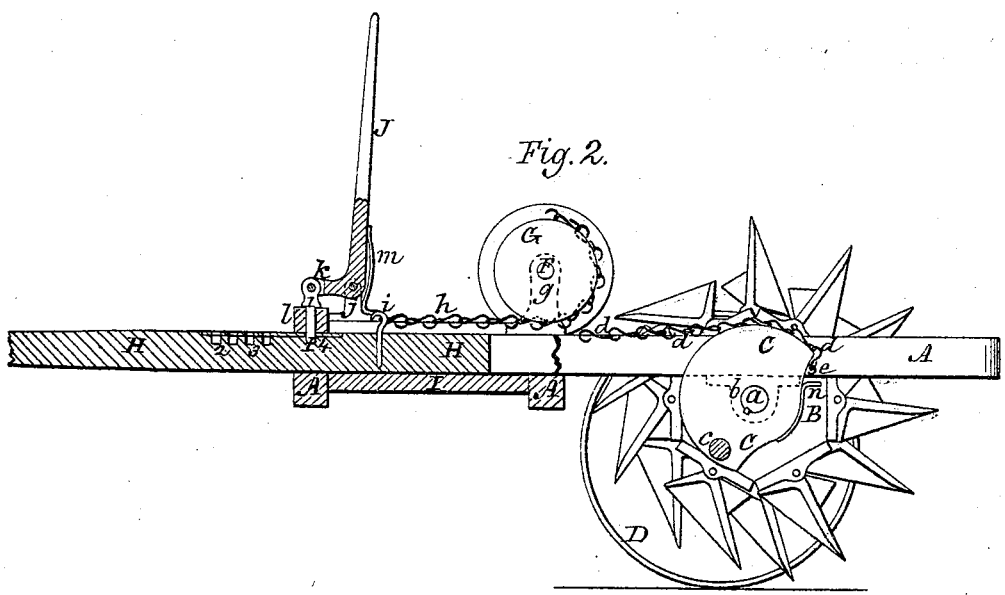

Figure 1 represents a top plan of the machine, and Fig. 2 represents a vertical and longitudinal section taken through the same.

My invention relates, first, to the manner of connecting the main carrying-wheels with the rotary plows, and to or with the main frame through the intervention of cranks or cams, so that by turning said cranks or cams, the plows can be raised up or let down at pleasure. It further relates to a mechanism, under the control of the operator, whereby the power of the team may be used to raise up or let down the plows, as may be desired.

To enable others skilled in the art to make and use my invention, I will proceed to describe the same with reference to the drawings.

The main frame of the machine is shown at A, and to the under rear portion of said main frame the block or cylinder B, that carries the plows, is hung by its journals $a$, supported and turning in suitable boxes $b$. Upon the outer ends of the journals $a$, respectively, are secured the cranks or cams C, so as to turn with said journals or the shaft on which the journals are made, said shaft extending through the block or cylinder B, and loosely, so that said cylinder can freely turn thereon independent of the shaft, and vice versa. To the cranks or cams C, respectively, are attached, as at the points $c$, the journals upon which the carrying and supporting wheels D are hung, and upon which they turn. The perimeters of the cranks or cams C are grooved, so as to receive and hold their respective chains $d$, one end of each of which chains is fastened to its crank or cam, as at $e$, and the other ends, respectively, to the grooved pulley-wheels E, as at $f$. These pulley-wheels E are fast on a common shaft, F, supported in bearings $g$ on the main frame A. Upon the shaft F, and centrally thereon, there is attached another pulley-wheel, G, to which one end of a chain, $h$, is fastened, the other end whereof is fastened, as at $i$, to the heel of the pole H, to which the team is hitched. The pole can move longitudinally in guides or ways I, fastened to the main frame, when released by the operator, as follows: In supports $j j$ on the guides or ways I is hung a crank-lever, J, to the short arm $k$ of which is pivoted a king-bolt, 1, which goes through a plate, $l$, fastened on the ways I, and into any one of a series of holes, 2 3 4, &c., in the pole, so that the pole may be allowed to move longitudinally, and locked at such position as the operator may desire or elect; and a spring, $m$, is so arranged in connection with the lever J as to keep the king-bolt 1 down in its locking position, but which spring admits of the operator moving said lever when he desires to raise the king-bolt and release the tongue; or, instead of the tongue or pole being so released and allowed to move, the double-trees, to which the team is more directly attached, may move, and the pole remain stationary, and accomplish precisely the same result, the chain in such case being fastened to the double-trees instead of the pole, and the king-bolt going through the double-trees and into any one of a series of holes, as above mentioned.

Upon one or both of the cranks or cams C there is a stop, $n$, which, upon coming against the main frame, defines the extent to which said cranks can turn, or the plows be raised up. If the cranks were allowed to swing too far it would disarrange the chains, and prevent the plows from dropping to the ground again when desired to have them do so.

When it is desired to raise the plows from the ground, the operator, who may ride on the machine, simply draws back the lever J, and so unlocks the pole from the main frame. The advance movement of the team moves the pole forward, and that through the chains and pulley-wheels turns the cranks or cams C, and raises the plows and main frame on the supporting-wheels D, which in turn rest upon the ground. A reverse operation lowers the plows.

Having thus fully described my invention, what I claim is—

1. The combination of the plow-cylinder and plows revolving around the shaft or journals $a$, the cranks or cams C, turning with said shaft or journals, and the journals $c$, on which the main wheels are supported and turn, eccentrically arranged on said cranks or cams, as and for the purpose described and represented.

2. In combination with the pole or doubletree, to which the team is hitched, and which is movable longitudinally independent of the main frame, and with the cranks or cams C, the chains and pulley-wheels for applying the power of the team to the raising of the plows from the ground, substantially as described.

JULIAN H. PITKIN.

Witnesses:
 S. H. PITKIN,
 C. P. HUMPHREY.